United States Patent
Knebel et al.

(10) Patent No.: US 6,820,190 B1
(45) Date of Patent: Nov. 16, 2004

(54) METHOD AND COMPUTER SYSTEM FOR DECOMPOSING MACROINSTRUCTIONS INTO MICROINSTRUCTIONS AND FORCING THE PARALLEL ISSUE OF AT LEAST TWO MICROINSTRUCTIONS

(75) Inventors: Patrick Knebel, Ft Collins, CO (US); Kevin David Safford, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/496,844

(22) Filed: Feb. 2, 2000

(51) Int. Cl.[7] .............................................. G06F 9/30
(52) U.S. Cl. ...................... 712/215; 712/22; 712/244
(58) Field of Search ........................ 712/22, 215, 224, 712/227, 244, 214

(56) References Cited

U.S. PATENT DOCUMENTS

| | | | | |
|---|---|---|---|---|
| 5,537,561 A | * | 7/1996 | Nakajima ..................... | 712/23 |
| 5,546,599 A | * | 8/1996 | Song ............................ | 712/23 |
| 5,598,546 A | * | 1/1997 | Blomgren ................... | 712/209 |
| 5,764,971 A | * | 6/1998 | Shang et al. ................ | 712/244 |
| 5,859,999 A | | 1/1999 | Morris et al. ............... | 712/224 |
| 5,860,017 A | | 1/1999 | Sharangpani et al. ......... | 712/23 |
| 6,038,652 A | * | 3/2000 | Phillips et al. .............. | 708/232 |
| 6,085,312 A | * | 7/2000 | Abdallah et al. ............ | 712/208 |
| 6,233,671 B1 | * | 5/2001 | Abdallah et al. ............ | 712/210 |
| 6,321,327 B1 | * | 11/2001 | Makineni et al. ............. | 712/22 |
| 6,330,657 B1 | * | 12/2001 | Col et al. ..................... | 712/23 |
| 6,357,016 B1 | * | 3/2002 | Rodgers et al. ............. | 713/601 |

OTHER PUBLICATIONS

Intel ®, Intel ® Architecture Optimization Reference Manual, 1998–1999.*
Hennessy and Patterson, Computer Architecture—A Quantitative Approach, $2^{nd}$ Edition, 1996, pp. 179, 181–183, 187, 190, A13, A15–A16.*
Thakkur, S. and Huff, T., "Internet Streaming SIMD Extensions," Computer, vol. 32, Iss. 12, 1999, pp. 26–34.*
Wolfe, A., "Patents shed light on Meced's Innards", Electronic Engineering Times, Feb. 15, 1999.

* cited by examiner

*Primary Examiner*—Eddie Chan

(57) ABSTRACT

The present invention is a method for processing instructions by decomposing a macroinstruction into at least two microinstructions, executing the microinstructions in parallel, and linking the microinstructions such that they appear as though they were executed as a single functional unit. The present invention operates by determining whether certain exceptions occur in either of the functional units, according to SSE rules for exceptions. If an exception does occur in any of the linked microinstructions, then the execution of each of those microinstructions is canceled. This avoids the necessity of a back-off or undo mechanism.

4 Claims, 6 Drawing Sheets

METHOD AND COMPUTER SYSTEM FOR DECOMPOSING MACROINSTRUCTIONS INTO MICROINSTRUCTIONS AND FORCING THE PARALLEL ISSUE OF AT LEAST TWO MICROINSTRUCTIONS

I. FIELD

The present invention relates to digital computer systems, and more particularly but not by way of limitation, to methods and an apparatus for processing instructions in such systems.

II. BACKGROUND

Microprocessors exist that implement a reduced instruction set computing (RISC) instruction set architecture (ISA) and an independent complex instruction set computing (CISC) ISA by emulating the CISC instructions with instructions native to the RISC instruction set. Instructions from the CISC ISA are called "macroinstructions." Instructions from the RISC ISA are called "microinstructions."

Figure 1A:
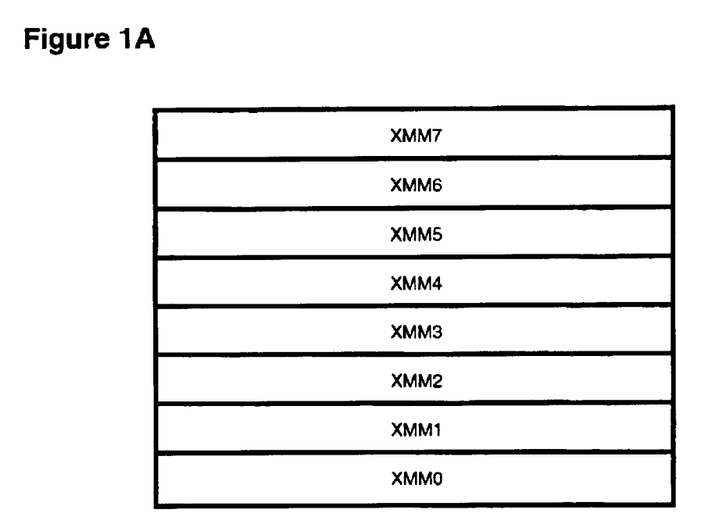
FIGS. 1A through 1D are block diagrams of components of the SSEs.
Figure 1B:
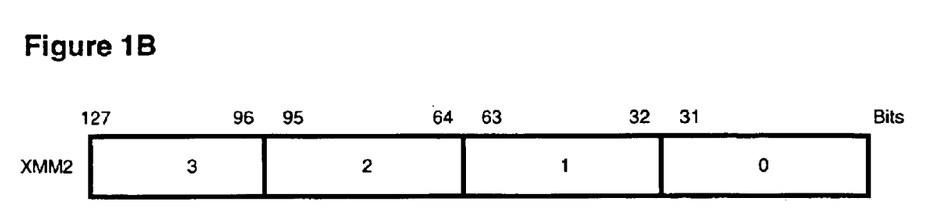

Streaming Single-Instruction Multiple-Data Extensions (SSEs) have been developed to enhance the instruction set of the latest generation of certain computer architectures, for example the IA-32 architecture. The SSEs include a new set of registers, new floating point data types, and new instructions. Specifically, the SSEs comprise eight 128-bit Single-Instruction Multiple-Data (SIMD) floating point registers (XMM0 through XMM7) that can be used to perform calculations and operations on floating point data. These XMM registers are shown in FIG. 1A. Each 128-bit floating point register contains four packed 32-bit single precision (SP) floating point (FP) numbers. The structure of the packed 32-bit SP FP numbers is illustrated in the example of FIG. 1B, where four 32-bit SP FP numbers (numbered 0 through 3) are shown as if stored in the XMM2 SSE register. In architectures designed to support the SSEs, such as its native architecture, a single instruction of the SSE instruction set operates in parallel on the four 32-bit SP FP numbers in a particular XMM register.

Figure 1C:
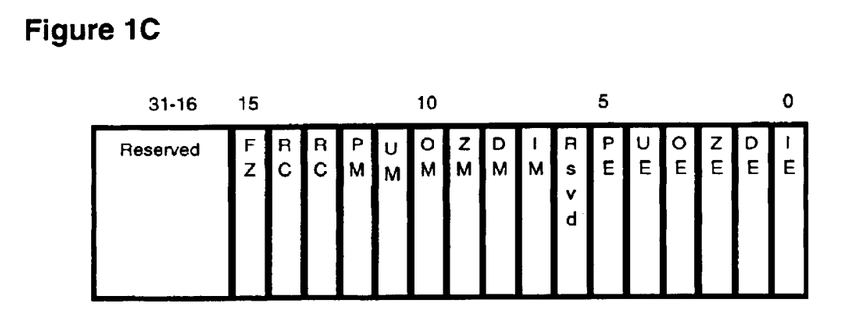

The SSEs also include a status and control register called the MXCSR register. The format of the MXCSR is illustrated in the example of FIG. 1C. The MXCSR register may be used to selectively mask or unmask exceptions. Specifically, bits 7–12 of the MXCSR register may be used by a programmer to selectively mask or unmask a particular exception. Masked exceptions are those exceptions that a programmer wishes to be handled automatically by the processor which may provide a default response. Unmasked exceptions, on the other hand, are those exceptions that the programmer wishes to be handled by invocation of an interrupt or an operating system handler. This invocation of the handler transfers control of the operating system (such as Windows by Microsoft) where the problem may be corrected or the program terminated.

The MXCSR register may also be used to keep track of the status of exception flags. Bits 0–5 of the MXCSR register indicate whether any of six exceptions have occurred in the execution of an SSE instruction. Those exceptions include the following: invalid operation (I), divide-by-zero (Z), denormal operation (D), numeric overflow (O), numeric underflow (U), or inexact result (P). The status of the flags are "sticky," meaning that once they art, set, they are not cleared by any subsequent SSE instruction, even if one is performed without exception. The status flags can only be cleared by a special instruction, usually issued from the operating system.

The exception flags of FIG. 1C are the result of a bitwise logical-OR operation on all four of the 32-bit SP FP operations that are performed on a particular 128-bit register XMM register. (One operation on each of the four 32-bit SP FP numbers.) Thus, if an exception occurs as to any one of the four 32-bit SP FP numbers, the exception flag for that particular type of exception will be raised, indicating some type of problem has occurred in the system. The invalid operation (I) divide by zero (Z), and denormal operation (D) exceptions are pre-computation exceptions, meaning that they are detected before any arithmetic or logical operations occur. That is, they can be detected without doing any computations. The other three exceptions, numeric overflow (O), numeric underflow (U), and inexact result (P) are post-computation exceptions, meaning that they are detected after the operations have been performed. It is possible for an operation performed on a sub-operand (i.e., one of the four operands in a 128-bit XMM register) to raise multiple flags.

SSEs have the following rules for exceptions:

1. When an unmasked exception occurs, the processor executing the instruction will not change the contents of the XMM register. In other words, results will not be committed or stored until it is known that no unmasked exceptions have occurred with respect to any of the four 32-bit SP FP numbers.

2. If there is a masked exception, all exception flags are updated.

3. In the case of unmasked pre-computation exceptions, all flags relating to pre-computation exceptions, whether masked or unmasked, will be updated. However, no subsequent computations are permitted, meaning that no post-execution exceptions can or will occur. This, of course, means that no post-execution exception flags will change or be updated.

4. In the case of unmasked post-computation exceptions, all post-execution conditions, whether masked or unmasked, will be updated, as will 41 pre-computation exceptions. Any pre-computation exceptions will be masked exceptions only because, if the pre-computation exception was unmasked, under Rule No. 3 above, no further computations would have been permitted.

Further information regarding streaming SIMD extensions may be found in the *Intel Architecture Software Developer's Manual*, (1999), Volumes 1 through 3, Intel Order Numbers 243190, 243191, 243192, which are hereby incorporated by reference.

Figure 1D:
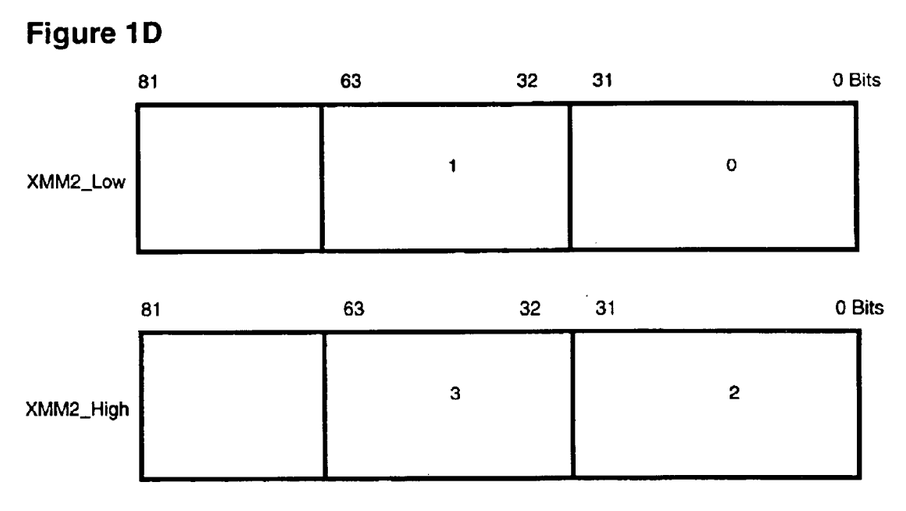

In many architectures, provisions have not been made for the SSE instructions. In these non-native architectures, the eight 128-bit floating point XMM registers capable of containing four 32-bit SP FP numbers are not available. In some non-native architectures, the eight 128-bit XMM registers may be mapped onto 16 floating point registers (e.g., IA-64 registers) that may be less than 128 bits and more than 64 bits wide. Specifically, some architectures use 82-bit registers to hold two 32-bit SP FP numbers (the bits in excess, of 64 may be used for the special encoding used to indicate the register holes SIMD-type 32-bit SP FP numbers). An example is shown in FIG. 1D. Note that the four 32-bit SP FP numbers 0–3 stored in the XMM2 register of the SSE native environment (FIG. 1B) are now stored in two 82-bit registers, XMM2_Low and XMM2_High, containing the "low half of the XMM2 register" and the "high half of the XMM2 register," respectively. This makes parallel execution of an operation on each of the four 32-bit SP FP numbers difficult.

Thus, in this non-native environment, the SSE instructions must be executed by emulation. Specifically, operations may first be performed on two of the four 32-bit SP FP numbers (in parallel) and then be performed on the remaining two 32-bit SP FP numbers (again, in parallel). Operations may alternatively be performed on only one or at least three of the 32-bit SP FP numbers. For example, an operation may be performed on the operands in the low half, XMM2_low, and then on the high half, XMM2_High. However, given the SSE rules for handling exceptions and updating exception flags, problems arise when emulating SSE instructions in this partially parallel, partially sequential manner. For example, consider a set of instructions being performed on the low half and high half of FIG. 1D:

XMM2:=OP(XMM3, XMM4)

emulated by

XMM2_Low:=OP(XMM3_Low, XMM4_Low)

XMM2_High:=OP(XMM3_High, XMM4_High)

Assume that the first instruction is executed without an unmasked exception as to the operands in the low halves, XMM3_Low and XMM4_Low. The results of this operation are then properly committed in XMM2_Low. Assume now that execution of the second instruction on the high halves results in a pre-computation unmasked exception. According to the SSE rules, no subsequent operations are then to be performed on any of the four 32-bit SP FP numbers because of that pre-computation unmasked exception. But here, however results of the operation on the low halves have been committed to register XMM2_Low in violation of the SSE rules. This corrupts the data in XMM2_Low and cannot be allowed to happen.

Prior machines have solved this problem by implementing a "back-off" mechanism that allowed them to speculatively change architectural state when the first microinstruction completed, than "undo" the change if the second microinstruction had an exception. This back-off mechanism may be hard to implement in certain machines, especially in machines that do not implement register renaming. In many systems, the use of a back-off or undo operation is difficult or limited, for various reasons.

One way of successfully emulating the SSEs and preventing this rule violation is to use a "shadow" register mechanism. In a shadow register mechanism, the results of a previous, successful operation on the low halves are physically stored in a shadow register. In this case, in the example above, when the exception is detected on the high halves, the results previously stored in the shadow register for the previous operation on the low halves may be re-stored, that is, an "undo" operation on the low halves as performed. The shadow register mechanism, however, is relatively complex. In most systems, there must be at least 16 registers available for storing the results of a previous operation on the low halves, and each must be capable of two 32-bit FP SP numbers. Additionally, when an "undo" operation is required, it must be determined which of the shadow registers the desired results are in. This mechanism consumes valuable register space that could otherwise be used more efficiently. Furthermore, a relatively complicated system of pointers and virtual maps are required to store the previous maps.

Another way to emulate a particular SSE instruction is to provide a back-off register mechanism. One skilled in the art will recognize that this technique may require a plurality of registers, a multiplexor and a de-multiplexor combination, various other hardware, and a new set of instructions. All of these increase cost and reduce efficiency.

Yet another way to emulate a particular SSE instruction is to execute the instruction with respect to each of the four 32-bit SP FP numbers in the SSE XMM register one at a time and store the results of each execution in temporary registers. When the instruction has been executed with respect to the fourth 32-bit SP FP number, and no unmasked exceptions, have occurred, the results may then be committed to the appropriate architectural location and exception flags be updated. This method of emulation requires the addition of a relatively complex micro-code sequence and the use of hardware that could otherwise be used more efficiently, not to mention the amount of clock cycles it consumes in executing an instruction four times before results can be committed.

Clearly, there exists a need for a method and an apparatus for emulating the SSE instruction set (and other instruction sets) that makes efficient use of existing hardware and that consumes relatively few clock cycles. Additionally, there exists a need for a method and apparatus for determining whether certain problems may occur in the execution of a series of instructions without committing the results of those instructions.

III. SUMMARY

The present invention is a method for processing instructions by decomposing a macroinstruction into at least two microinstructions, executing the microinstructions in parallel on two separate functional units, and linking the microinstructions such that they appear as though they were executed as a single functional unit. The present invention operates by determining whether certain exceptions occur in either of the functional units, according to SSE rule, for exceptions. If an exception does occur in any of the linked microinstructions, then the execution of each of those microinstructions is canceled. This avoids the necessity of a backoff or undo mechanism.

The present invention is also a computer system for processing software instructions, having a processor with a floating point unit, a ROM, and floating point registers. The processor is configured to decompose a macroinstruction into at least two microinstruction, to execute those microinstructions in parallel, and to link those instructions such that they appear to execute as a single functional unit. The processor also is capable of identifying and treating exceptions without the use of a back-off or undo mechanism.

V. DETAILED DESCRIPTION

A. The Computer System

Figure 2:
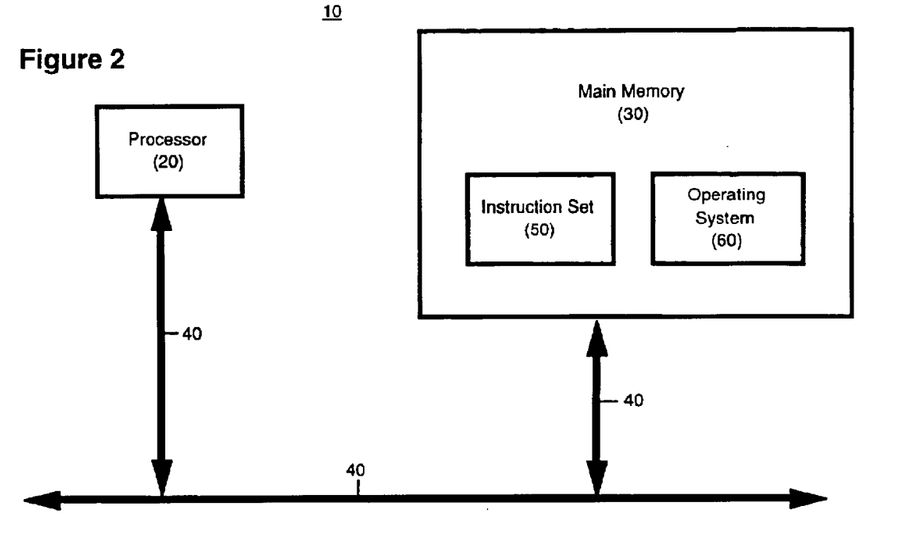
FIG. 2 is a block diagram of a computer system including the present invention.

FIG. 2 illustrates a computer system 10 in which the present invention may be implemented. The computer system 10 comprises at least one processor 20, main memory 30, and various interconnecting data, address, and control busses (numbered collectively as 40). An instruction set 50C, which may include SSEs, and an operating system 60 may be stored in main memory 30.

Figure 3:
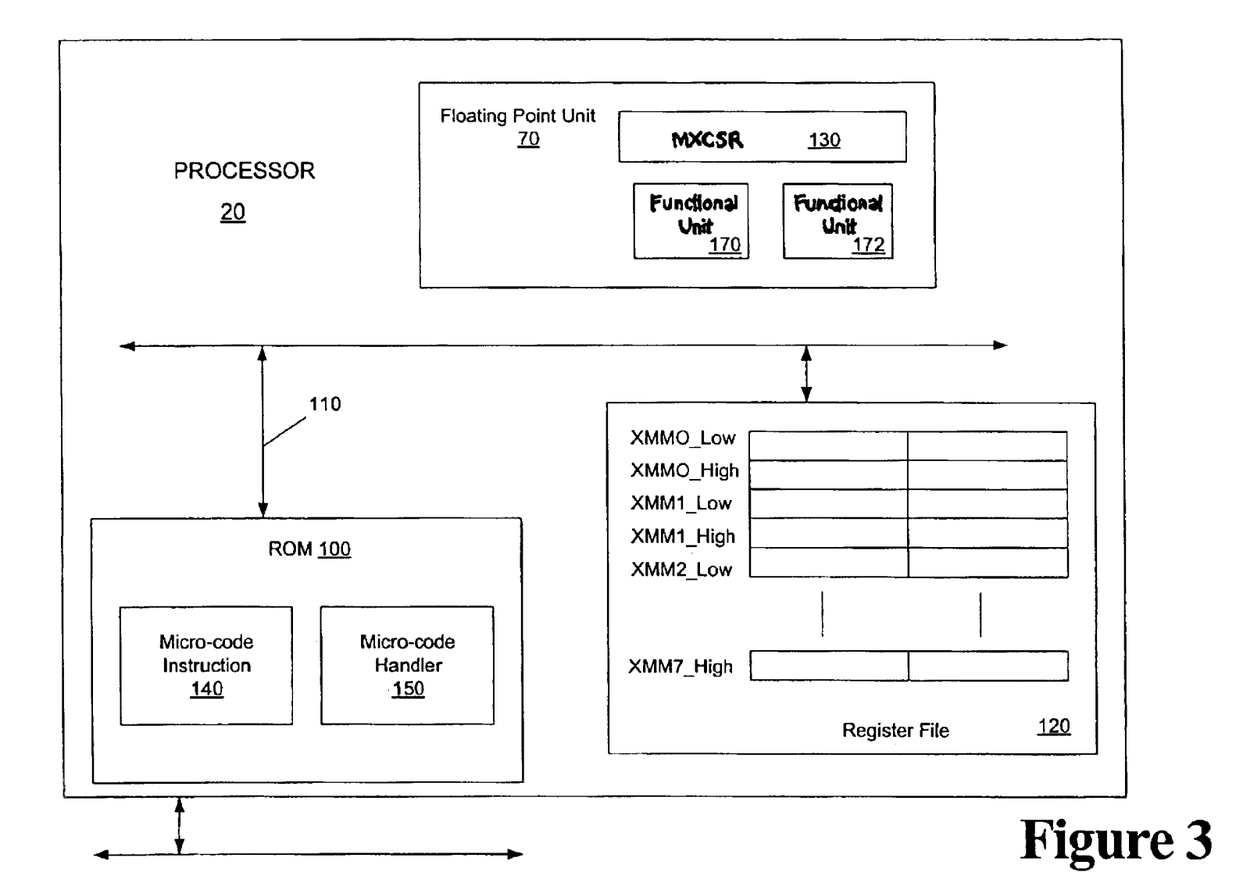
FIG. 3 is a block diagram of the processor in FIG. 2.

As illustrated in FIG. 3, the processor 20 comprises a floating point unit 70, a micro-code ROM 100, various busses and interconnections (numbered collectively as 110) and a register file 120 comprising the sixteen floating point registers, XMM0_Low through XMM7_High, needed to emulate the SSE XMM registers. In one embodiment, the sixteen floating point registers are 82-bit registers, but other widths (e.g., 128-bit or 64-bit) may be used, as the following description in terms of 82-bit registers is exemplary only, and not intended in a limiting sense. The four 32 bit SP floating point numbers of the SSEs may be stored in two of the 82-bit SP FP registers of the present invention (e.g., XMM2_Low and XMM2_High, as illustrated in FIG. 1D). The floating point unit 70 comprises a first 32-bit register 130 that corresponds to the MXCSR register of the SSEs and at least two functional units (e.g., 170, 172) used to execute two FP operations.

Instructions are provided to the processor 20 from main memory 30. The instructions provided to the processor 20 are macro-code instructions that map to one or more micro-code instructions 140 stored in the micro-code ROM 100. The micro-code instructions can be directly executed by the processor 20. Also stored in the micro-code ROM 100 are a set of micro-code handlers 150 that may be invoked to handle certain unmasked processor exceptions. The processor 20 may have a pipelined architecture and may allow for parallel processing of certain instructions.

B. In Use

The IA-32 ISA defines streaming, SIMD extensions, or SSE instructions, that allow a single instruction to operate simultaneously on multiple single-precision (SP) floating-point (FP) values held in a register file that is eight entries deep and 128 bits wide. Since single-precision floating-point numbers can be represented in 32 bits, each SSE register can hold four packed SP values, and each SSE instruction can calculate four SP results. Even though the IA-32 ISA specifies 128-bit registers and instructions that can operate on 128 bits, of data, an implementation may choose to implement narrower registers or FP functional units that can only calculate one or two FP SP operations at a time. It is possible, then, to implement the SSE instructions by emulating them on multiple functional units by executing the four FP SP operations serially over multiple cycles, or by some combination of both of these techniques. The ISA only requires that any architecturally visible side effects of the operations appear as though all four operations occurred concurrently in the hardware.

In a preferred embodiment, a RISC ISA is implemented containing FP registers that are 82 bits wide. Thus, to emulate SSE instructions on this implementation, two FP registers are required to emulate the requisite four 32-bit SP FP values contained in one SSE register. Also, the RISC ISA defines its own SIMD operations that operate on two SP values with one instruction. So in this implementation, two RISC microinstructions are required to emulate a single SSE macroinstruction.

SSE instructions may cause exceptions when they execute, depending on the values of the operands. The IA-32 architecture defines six possible exceptions three pre-computation and three post-computation. Pre-computation exceptions are those which are calculated based on the values of the source registers, whereas post-computation exceptions are calculated based on the value of the result of the computation. The architecture also defines a control and status register, the MXCSR. The MXCSR contains control bits that can independently mask each exception and flag bits that capture the status of any exceptions that occur.

A preferred embodiment of the present invention includes a method for issuing two RISC microinstructions in parallel, a method for updating the flags based on the results of both FP units, and a method for causing an exception in either FP unit to inhibit setting a result register in both FP units.

When executing in native mode (RISC ISA), the implementation is required to have precise exceptions. That is, if an instruction causes an exception, then all subsequent instructions in the instruction stream must be flushed from the process. Even if an implementation is executing multiple instructions in parallel, the sequential semantics must be adhered to. For example, in the following instruction stream:

op1—oldest instruction op2 op3 op4

. . .

opN—youngest instruction

Op1 is the oldest instruction, and if it takes a fault, the processor must flush all younger operations (op2—opN). If the processor executes two operations in parallel and pipelines new operations every cycle, all these operations might be "in flight" at the same time. For example, op1 and op2 might have issued in parallel and may be close to completion, while op3 and op4 are in flight one cycle behind, op5 and op6 are in flight two cycles behind, etc. If op1 takes an exception, all operations (op1 through op6) must be flushed. But if op2 takes an exception, only operations op2 through op6 must be flushed.

Figure 4:
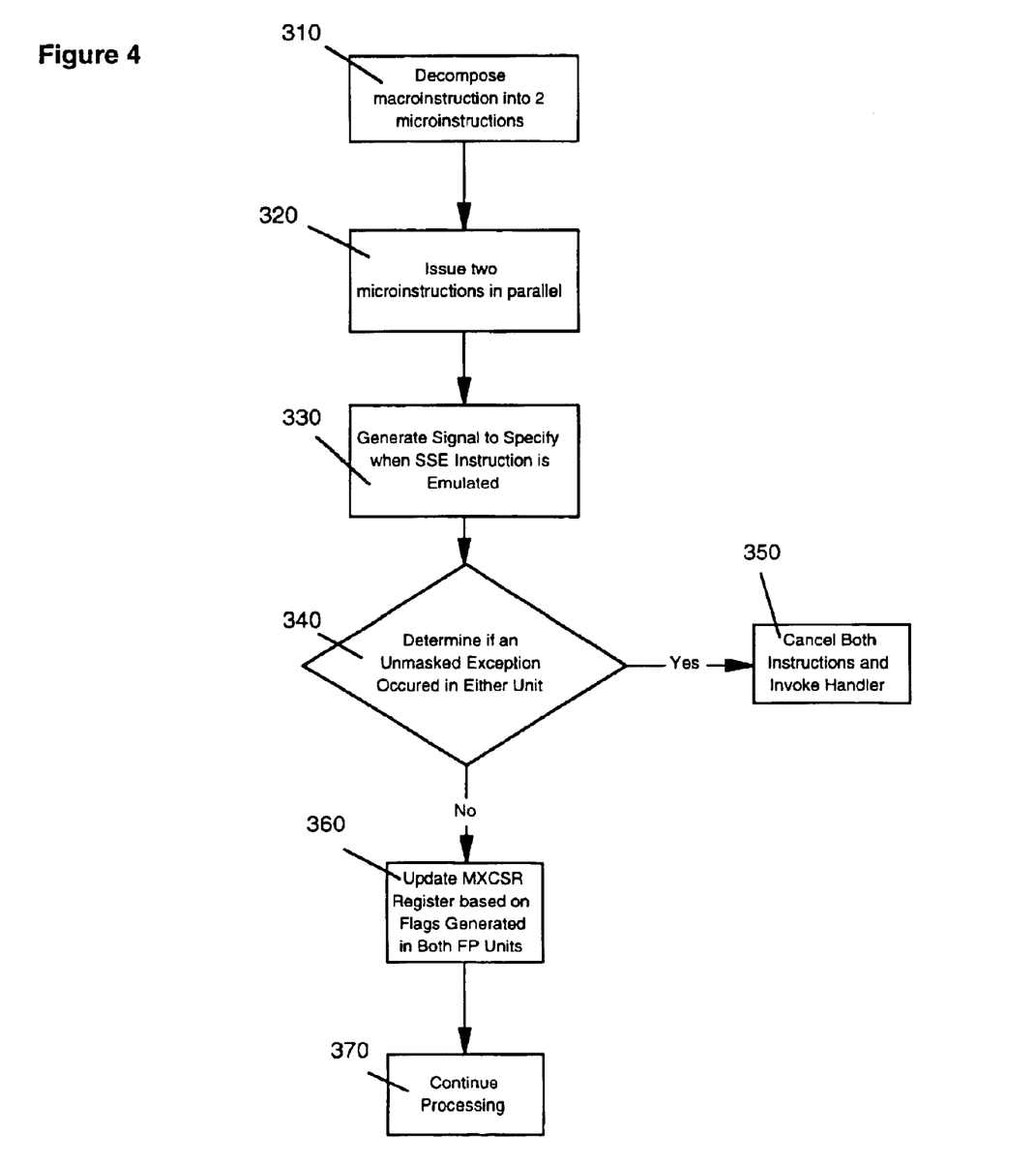
FIG. 4 is a flow chart of the method of the present invention.

FIG. 4 is a flow chart showing the steps required to implement the present invention, to emulate SSE instructions. First, a macroinstruction is decomposed into two or more microinstructions in a decompose function 310. The two microinstructions used to emulate the high half and the low half of the SSE operation are forced to issue in parallel and are dispatched simultaneously to the two FP units each capable of calculating two SP values per cycle, as shown in the emulation function 320. This is accomplished via a mechanism claimed in previously co-pending patent application, now issued U.S. Pat. No. 6,618,801 entitled "Method and Apparatus for Implementing Two Architectures In a Chip Using Bundles That Contain Microinstructions and Template Information," inventors Knebel, et al., filed on the same date as this application, which is hereby incorporated by reference. Both micro-operations must be treated as a single operation. They move in lockstep with each other.

A signal is then generated by the emulation hardware and sent to the FP functional unit to specify when an SSE instruction is being emulated, as shown in the signal generation function 330. Then, when a signal fires, an exception detection function 340 determines whether an exception is taken in either FP functional unit. If an exception is taken in either FP functional unit, then the results from both FP functional units must be cleared, the execution is canceled, and a handler is invoked, as shown by the cancellation function 350. The invention must be capable of flushing the result in the other FP functional units, regardless of the relative age of the microinstructions in the two functional units. When a signal above fires, the MXCSR flag must be updated based on the results of both functional units, as shown in the update function 360. Following the successful completion of the execution of the microinstructions, the process continues, as shown in the continuation function 370.

Bundler

As noted above, the present invention operates by the use of a bundler. The bundler is part of the emulation engine.

The emulation engine processes a sequence of operations (XUOPs). Between the emulation front end and the bundler is an XUOP queue, also referred to as an XUOP buffer. Within the emulation front end 0 is a microcode ROM (uROM). The uROM delivers information to the bundler. The function of the bundler is to take XUOPs and other information (including ZUOPs) delivered from the emulation front end within the emulation engine, converts this information into a valid 16-byte bundle as defined by the RISC ISA, and deliver to the execution engine two 16-byte bundles and associate pre-decode bits that can be decoded and executed in parallel without violating any architectural dependencies within the pair of bundles.

The emulation front end is required to deliver the following bits of information (referred to as "ZUOPs"), in addition to other information not described herein. These ZUOPs are to be used by the bundler as it creates the two 16-byte bundles.

1. Syllable: 41-bit instruction that is understood by the execution engine.
2. Immediate: 32-bit immediate field that can be used as an operand.
3. Op-type: 3-bit field specifying which functional units can execute this type of Syllable.
4. Sub-Type: 3-bit field specifying further information specific to a particular Op-Type.
5. Bnd-Hint: 2-bit field indicating, certain dependency restrictions between this Syllable, its predecessor and successor Syllables.
6. Reg-Valid: 4-bit field specifying whether each lf four separate fields within in the 41-bit Syllable contain valid register identifiers.

Figure 5:
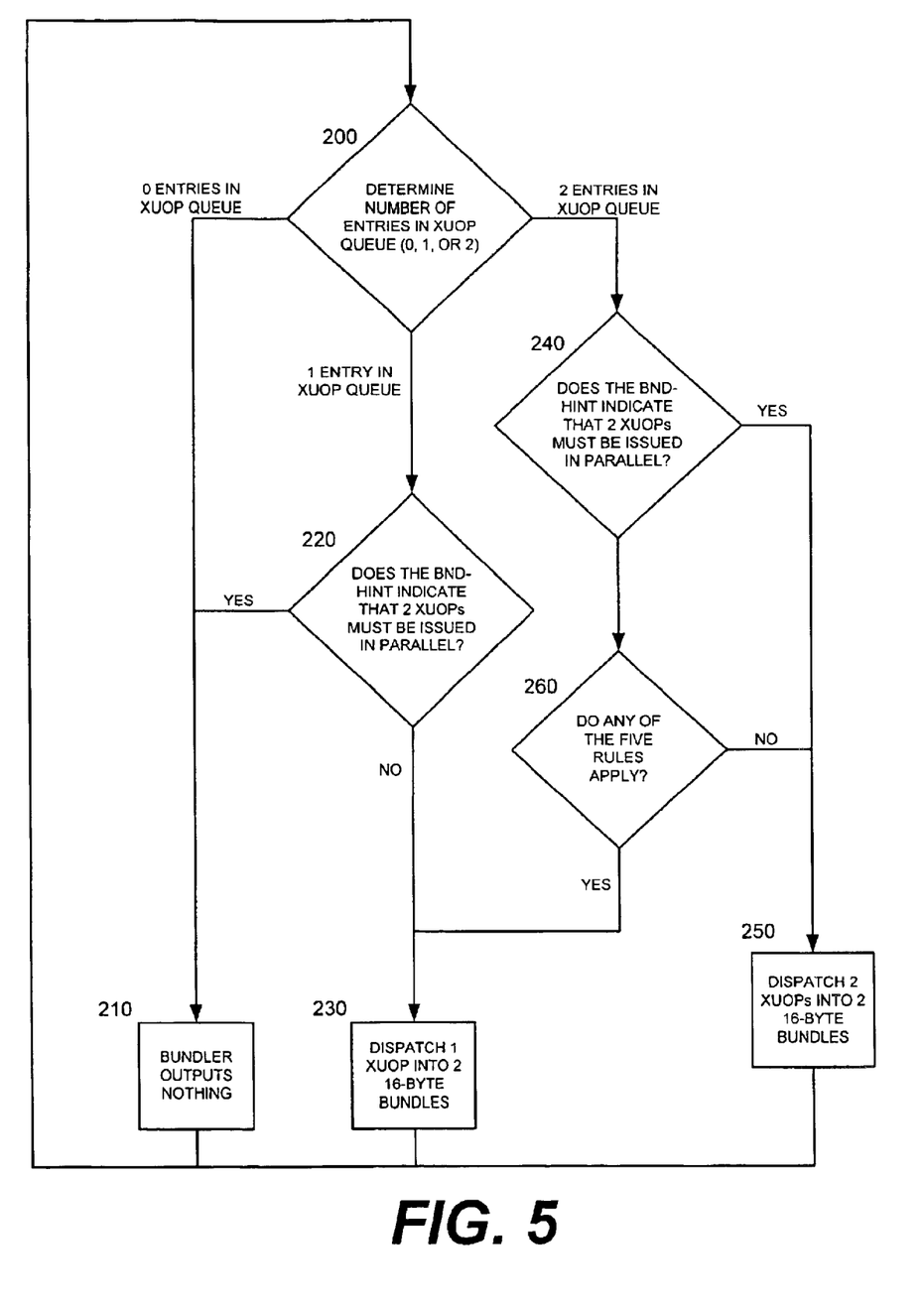
FIG. 5 is a flowchart showing the operation of the bundler.

FIG. 5 shows the operation of the bundler in determining how many XUOPs to issue. The bundler issues either 0, 1, or 2 XUOPs per issue-group. The bundler attempts to issue two XUOPs at the same time, if possible. This determination is based on the number of XUOPs in the XUOP queue and on the application of certain rules, described below. The bundler must first determine how many entries are in the XUOP queue, in a determination function 200. If the XUOP queue has no entries, then the bundler outputs nothing, as shown by the no XUOP output function 210.

If the XUOP queue has one entry, then a determination function 220 determines whether the Bnd-Hint indicates that two XUOPs must be issued in parallel. If two XUOPs do not need to be issued in parallel, then the one XUOP in the XUOP queue is dispatched into two 16-byte bundles in the one XUOP output function 230. If the determination function 220 determines that two XUOPs must be issued in parallel, then the bundler outputs nothing in the no XUOP output function 210.

If the XUOP queue has two entries, then a determination function 240 determines whether the Bnd-Hint indicates that two XUOPs must be issued in parallel. If the determination function 240 determines that 2 XUOPs must be issued in parallel, then two XUOPs are dispatched into two 16-byte bundle, in the two XUOP output function 250. If the determination function 240 determines that two XUOPs are not required to be issued in parallel, then the determination function 260 determines whether any of the following five rules apply:

1. A specific bit in a machine specific register is set to restrict dual issue.
2. Both XUOP's are destined for the same execution unit, unless they are both floating point operations or if they are both "general" ALU operations.
3. Both XUOP's have a Sub-Type that indicates they modify floating point (FP)-stack resources.
4. Both XUOP's have a Sub-Type that indicates they could flush the pipeline based on a comparison result.
5. Comparing register fields that are indicated to be valid by the Reg-Valid bits shows that there is a register dependency hazard between two XUOP's.

If none of the five rules apply, then two XUOPs are dispatched into two 16-byte bundles in the two XUOP output function 250. If any of these five rules do apply, then one XUOP is dispatched into two 16-byte bundles, in the one XUOP output function 230.

Although the present invention has been described in detail with reference to certain embodiments thereof, variations are possible. Therefore, the present invention may be embodied in other specific forms without departing from the essential spirit or attributes thereof. It is desired that the embodiments described herein be considered in all respects as illustrative, not restrictive, and that reference be made to the appended claims for determining the scope of the invention.

What is claimed is:

1. A method for processing software instructions comprising:

in an in-order execution machine, decomposing a macroinstruction into a plurality of microinstructions;

forcing the parallel issue of at least two of the plurality of microinstructions simultaneously regardless of conflict checking;

executing all of the at least two of the plurality of microinstructions simultaneously, in lockstep using functional units in a floating point unit;

determining whether an exception occurs in any of the at least two of the plurality of microinstructions, before writing results of the executing to result registers wherein the determining step is performed prior to any writing step and the method does not write any results to temporary registers;

if an exception occurs in any of the at least two of the plurality of microinstructions, canceling all of the at least two of the plurality of microinstructions and preventing the results of the executing from being written to the result registers; and if no exception occurs in any of the at least two of the plurality of microinstructions, writing the results of the executing to the result registers.

2. The method of claim 1, further comprising:

determining whether at least two of the plurality of microinstructions must be issued in parallel.

3. A computer system comprising:

a processor comprising:
a floating point unit comprising a plurality of functional units adapted to execute microinstructions;
a ROM;
a plurality of floating point registers;
wherein the processor is configured to emulate an instruction set by:
in an in-order execution machine, decomposing a macroinstruction into a plurality of microinstructions;
forcing the parallel issue of at least two of the plurality of microinstructions simultaneously to the functional units regardless of conflict checking;

determining whether an exception occurs in any of the functional units, wherein the determining step is performed prior to any setting step and the method does not set any temporary registers;

setting result registers for results of each of the functional units only if no exception occurs in any of the functional units; and if an exception occurs in any of the at least two of the plurality of microinstructions, canceling all of the at least two of the plurality of microinstructions and preventing the setting of result registers for all of the functional units.

4. The computer system of claim 3, wherein the processor is further configured to emulate an instruction set by:

determining whether at least two of the plurality of microinstructions must be issued in parallel.

* * * * *